ll
UNITED STATES PATENT OFFICE.

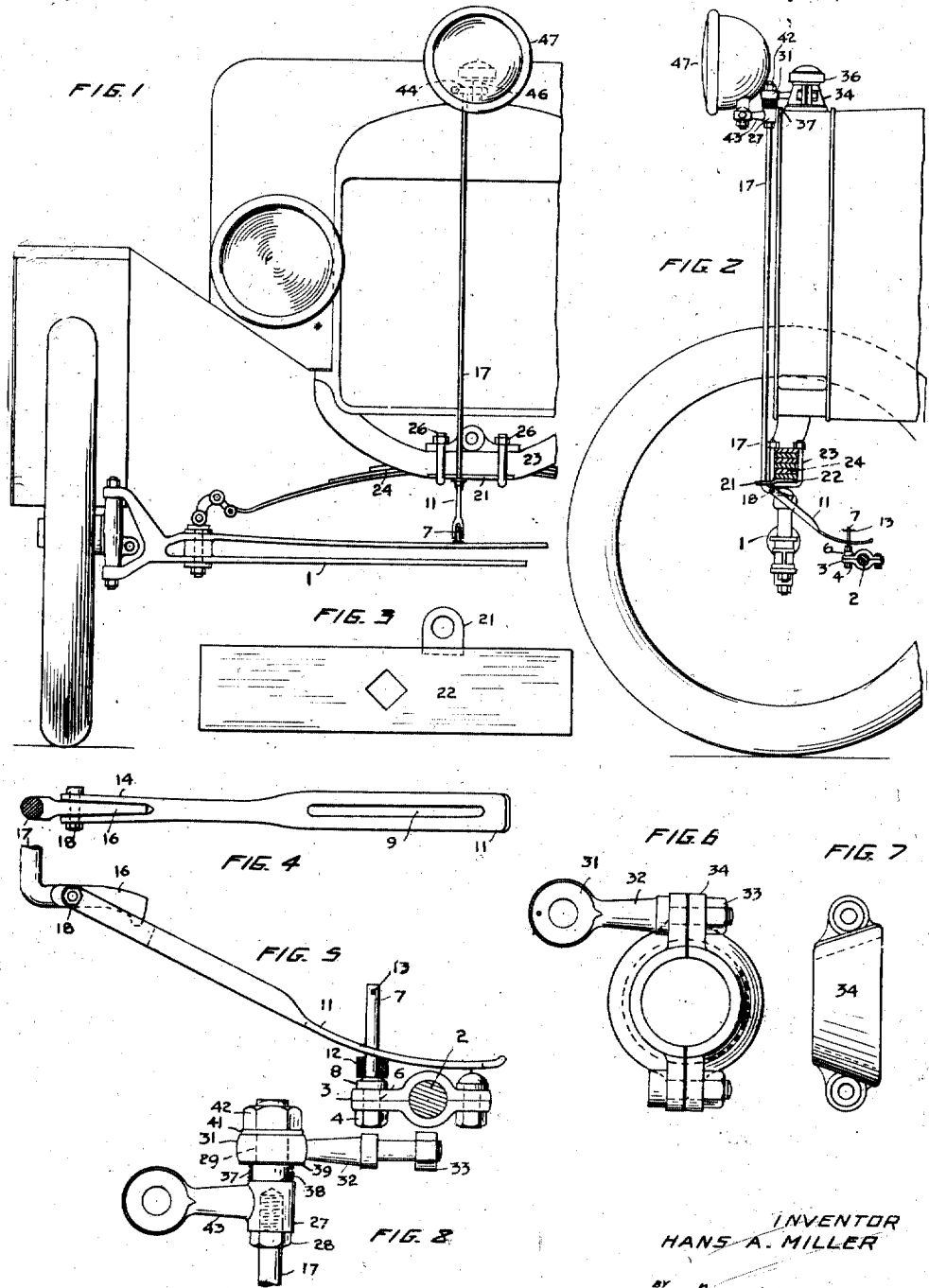

HANS A. MILLER, OF SELBY, CALIFORNIA.

AUTOMATICALLY-DIRECTED HEADLIGHT.

1,234,484.  Specification of Letters Patent.  Patented July 24, 1917.

Application filed April 2, 1917. Serial No. 159,145.

*To all whom it may concern:*

Be it known that I, HANS A. MILLER, a citizen of the United States, residing at Selby, in the county of Contra Costa and State of California, have invented new and useful Improvements in Automatically-Directed Headlights, of which the following is a specification.

The present invention relates to that class of devices in which a head light of a car is automatically turned with the turning of the front wheels of the car, so that the illumination therefrom is directed in the line in which the car is traveling. The object of the invention is to provide a device of this character which will be simple and inexpensive, which will not be affected by the vertical motion of the car, the parts of which will be prevented from rattling, so that the device may be noiseless, and in which any horizontal vibration of the lamp due to slight changes in direction of motion of the front wheels will be avoided, thereby eliminating the flickering light which would otherwise be produced by said lamp and cause much annoyance to the driver of the car.

In the accompanying drawing, Figure 1 is a broken front view of an automobile equipped with my invention; Fig. 2 is a broken side view thereof; Fig. 3 is a plan view of a plate forming a part thereof; Fig. 4 is a cross-sectional view of a shaft, showing an arm in plan view; Fig. 5 is a detail vertical sectional view showing the shaft and arm in side view; Fig. 6 is a plan view of a clamp showing an arm supported thereby; Fig. 7 is a rear view of said clamp; Fig. 8 is a side view of a spindle and parts connected therewith.

I have herein shown my improved device as applied to a Ford car, although, with suitable changes which will readily suggest themselves to the skilled mechanic, it can equally well be applied to a car of any other make.

Referring to the drawing 1 indicates the front axle of a car and 2 the spindle connecting rod thereof. Around said rod, a little to one side of its center, is secured a clamp 3, through a hole in the front end of which is secured by a nut 4 a bolt 6, having a pin 7 extending upwardly from the head 8 of the bolt. Said pin passes through a longitudinally extending slot 9 in the rear end of a curved arm 11. Around the pin 7 is a rubber tube or washer 12 which rests upon the head 8 of the bolt, and on which the arm 11 can rest. A cotter pin 13 passes through the pin ear the top to limit the upward movement of the arm 11 around the pin 7.

The front end of the arm 11 is forked, as shown at 14, the fork members extending on opposite sides of a flat finger 16, extending rearwardly from the lower end of a vertical shaft 17, said members being pivoted to said finger by a bolt 18. As said arm 11 is turned, it correspondingly turns the finger 16, and also the shaft 17 about its axis. The outer end of the finger is of such width that it is always contained between the forks of the arm 11, to strengthen the connection between the arm and the finger. Said shaft 17 has a lower bearing through a forward extension 21 from a plate 22, which is secured between the lower edges of the side members of the channeled piece 23, between which are contained the leaves 24 of the front spring of the car, said plate being held against the lowermost leaf by the U-bolts 26 which are already used to secure the spring in said channeled piece 23.

To attach the plate 22, it is necessary to slacken the nuts from the U-bolts 26 to permit said U-bolts to drop a sufficient distance, insert the plate 22 between the U-bolts, and at the same time moving it, first, in one direction and then in the other, and then to tighten the nuts on the U-bolts.

The upper end of said shaft 17 is threaded, and is screwed into a socket in the lower end of a spindle 27, a lock nut 28 being screwed upon said shaft below said spindle to firmly lock the spindle to the shaft so that it will turn therewith. The upper end of the spindle is reduced in diameter, as shown at 29, and extends through a bearing 31 in the front end of an arm 32, the rear end of which is secured by a nut 33 to a clamp 34, clamped around the radiator neck 36. A coiled spring 37 is compressed between a shoulder 38 on said spindle and a fiber washer 39. A nut 42 is screwed upon the upper end of the spindle, and said washer 39 and a fiber washer 41 are thus pressed against the lower and upper faces respectively of the arm 32.

From the spindle 27 extends forwardly an arm 43, having in its forward end a hole in which is clamped one end of a horizontal arm 44, the other end of which carries a standard 46 supporting a lamp 47.

It results from the above construction that any longitudinal motion of the spindle connecting rod, to cause the front wheels to turn, is accompanied by a corresponding transverse motion of the rear end of the arm 11, thereby causing the shaft 17 to turn correspondingly, and turning the spindle 27, and the lamp 47. The reciprocating motion of the car in a vertical direction will in no way affect this turning movement, for it will not turn the effective radius of the arm tending to turn the shaft 17. Owing to obstructions met with in the roadway, which tend to slightly deflect the wheels of the car from their normal direction, the front wheels of the car are momentarily changing their direction slightly, independent of their being steered by the driver. If the direction of the lamp is made exactly dependent upon that of the front wheels, corresponding slight momentary deflections of the lamp will result. A very small angular change in the position of the lamp will produce a very considerable change in the position of the light thrown by the lamp upon the roadway, say, forty or fifty feet ahead. Consequently, the horizontal vibration of the lamp, caused by the slight momentary deflections of the front wheels, will cause the illumination produced by the lamp to flicker, a very annoying result.

It is for the purpose of avoiding this flickering illumination that I provide the fiber washers 39 and 41, which are pressed against the arm 32 by the coiled spring 37. The pressure of these washers produces an amount of friction sufficient to prevent the spindle from making slight changes in its angular position and thus avoids the objectionable flickering. At the same time, the connections between the different parts are sufficiently loose to permit the washers to have this result.

Important advantages of my improved device are its great simplicity, economy in construction, and the ease with which it can be attached to a car. To make the attachment only three changes are necessary, namely, to clamp the clamp 3, around the spindle connecting rod, to clamp the clamp 34 around the radiator neck, and to secure the plate 22 in position.

Another important advantage attendant upon my improved device resides in the fact that, since the lamp is always plainly visible to the driver, the device is of great value even in the day time, as the driver can always determine, by looking at the lamp, in what line his front wheels are directed, so that he knows in what direction he will travel either in starting forward or in backing, which he cannot do at present in a car of ordinary construction without getting out of the car.

I claim:—

1. In means for automatically directing an automobile lamp an upwardly extending pin secured to the spindle connecting rod of the automobile, a bearing secured to the front spring of the automobile, a shaft extending upwardly through said bearing, an arm pivotally connected to the lower end of said shaft to swing vertically and having therein a longitudinally extending slot, said pin extending upwardly through said slot, a spindle secured to the upper end of said shaft, an arm of which the rear end is clamped around the radiator neck of the automobile, and the front end has a bearing in which said spindle can turn, a washer of yielding material around said spindle on each side of said bearing, a spring coiled around the spindle and compressed between a part of the spindle and the washer on one side of said bearing, a lock nut screwed upon said spindle on the other side of said bearing and between which and the bearing the other washer is interposed, an arm extending from said spindle and adapted to support the lamp.

2. In means for automatically directing an automobile lamp, an upwardly extending pin secured to the spindle connecting rod of the automobile, a bearing secured to the front spring of the automobile, a shaft extending upwardly through said bearings, an arm pivotally connected to the lower end of said shaft to swing vertically and having therein a longitudinally extending slot said pin extending upwardly through said slot, an arm of which the rear end is clamped around the radiator neck of the automobile, and the front end prevents horizontal displacement of the shaft while permitting it to rotate about its axis, means for frictionally resisting said rotary movement, and means, rotatable with said shaft, for supporting the lamp.

3. In means for automatically directing an automobile lamp, an upwardly extending pin secured to the spindle connecting rod of the automobile, a bearing secured to the front spring of the automobile, a shaft for supporting the lamp and extending upwardly through said bearing, an arm pivotally connected to the lower end of said shaft to swing vertically and having therein a longitudinally extending slot, said pin extending upwardly through said slot, and an arm of which the rear end is clamped around the radiator neck of the automobile, and the front end prevents horizontal displacement of the shaft while permitting said shaft to rotate about its axis.

HANS A. MILLER.